Jan. 15, 1963     J. B. BELTZ     3,073,647
VEHICLE BODY
Filed Feb. 18, 1960     5 Sheets-Sheet 1
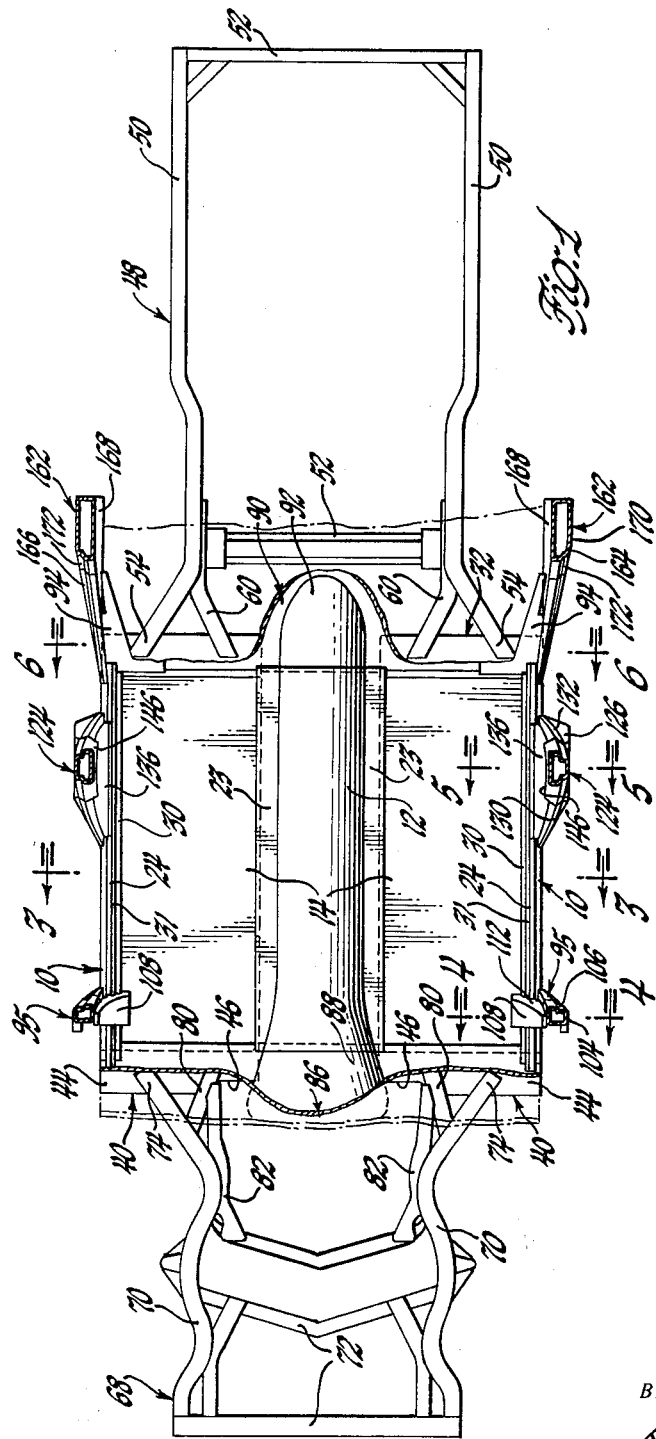
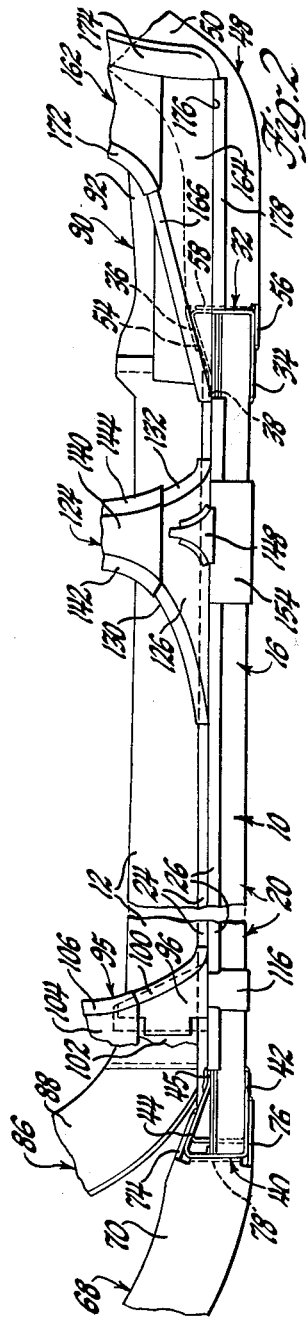
INVENTOR.
*John B. Beltz*
BY
*Herbert Furman*
ATTORNEY

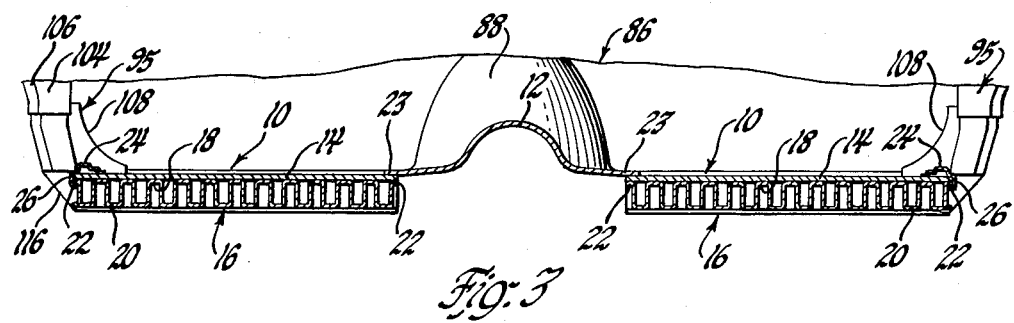
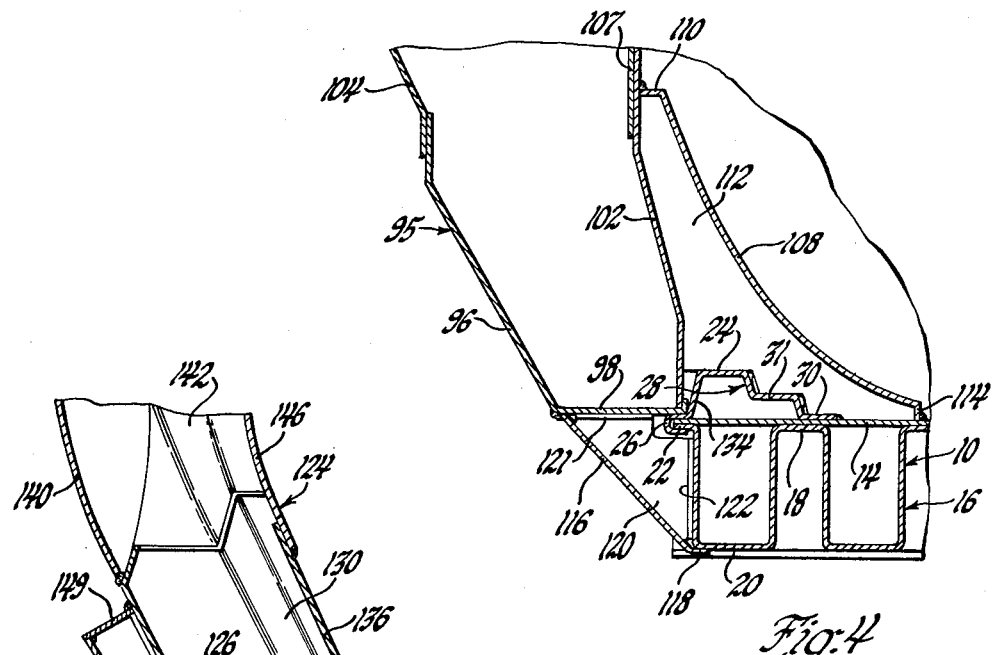
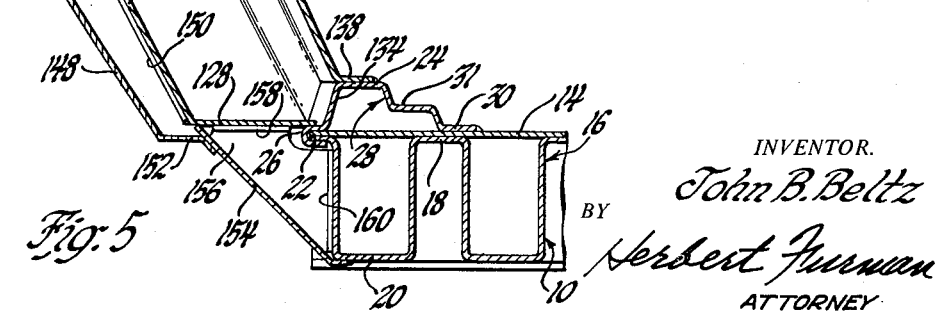

INVENTOR.
John B. Beltz
BY
Herbert Furman
ATTORNEY

Jan. 15, 1963

J. B. BELTZ
VEHICLE BODY 3,073,647

Filed Feb. 18, 1960

INVENTOR.
John B. Beltz
BY
Herbert Furman
ATTORNEY

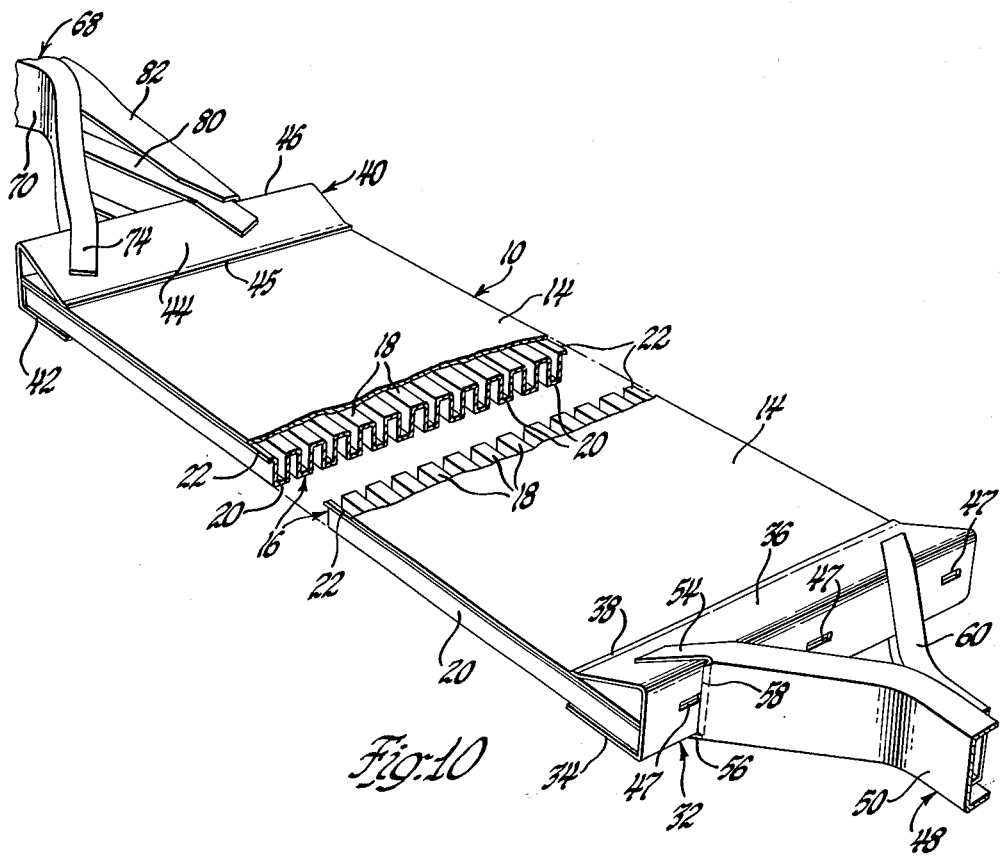

United States Patent Office 3,073,647
Patented Jan. 15, 1963

3,073,647
VEHICLE BODY
John B. Beltz, East Lansing, Mich., assignor to General Motors Corporation, Detroit, Mich., a corporation of Delaware
Filed Feb. 18, 1960, Ser. No. 9,481
3 Claims. (Cl. 296—28)

This invention relates generally to vehicle bodies, and more particularly to an underbody structure for unitary vehicle bodies.

At the present time, vehicle bodies may be generally classified as either of the body and frame type or of the unitary or integral type. In the body and frame type of construction, the body is a separate unit, and is secured to a separate chassis frame. In the unitary or integral type of construction, the frame is included as part of the body, and this is usually done by strengthening the floor pan of the body with one or more large transverse strengthening ribs, both on the upper and lower sides of the floor pan. Frame extensions which are either bolted to the body or made a part thereof support the power plant and the rear deck area of the body.

The underbody structure of this invention generally comprises a pair of rigid self-supporting platform members disposed in side by side relationship and interconnected by a tunnel cap to thereby provide a rigid self-supporting combined underbody and floor for the body. Each of the platform members is of like construction and includes an upper flat panel and a lower corrugated member which is coextensive with the upper panel and secured thereto. The corrugations of the lower member are arranged to provide an upwardly opening corrugation immediately adjacent the inboard and outboard side edges of the upper panel, with each of these corrugations terminating in a short laterally extending flange secured to the inboard and outboard edges of the upper panel member to provide pinchwelds. The inboard pinchweld is secured to a flange of the tunnel cap, and the outboard pinchweld is received within and secured to an overlapping flange of a rigidifying sillplate member. The outboard corrugation provides the rocker panel of the body.

Each end of the platform members is closed by a generally channel-shaped end cap rigidly secured to the platform member. Front and rear generally U-shaped frame extensions are provided, and the ends of the side rails of the frame extensions straddle and are secured to each of the end caps to thereby attach the frame extensions to the platform members. The toe pan is secured to the forward edge of the tunnel cap and to the upper panel adjacent the front end caps and extends forwardly over the front end caps and the rearward ends of the side rails of the front frame extension. The rear seat riser panel is likewise secured to the rearward edge of the tunnel cap, and to the upper legs of the rear end caps and extends rearwardly over the forward ends of the side rails of the rear frame extension. The pillar structures sweep outwardly and upwardly from the platform members to define the door openings.

An underbody structure such as this provides an extremely rigid support for the upper body shell and has excellent transverse and longitudinal torsional bending moments which are substantially higher than those of conventional underbody structures for integral bodies. Additionally, the over-all height of the vehicle can be very substantially reduced while still maintaining a flat floor for the passengers so as to provide ease of entrance and exit. This is an important advantage of the subject structure when compared to the usual integral underbody structure wherein the floor pan is depressed between the sill structures and the tunnel in order to accommodate the various heavy transverse ribs and still provide adequate leg room and chair height for the driver and passengers.

The primary object of this invention is to provide an improved underbody structure for unitary vehicle bodies. Another object of this invention is to provide an improved underbody structure for unitary vehicle bodies which includes a pair of rigid self-supporting platform members disposed in side by side relationship and interconnected by a tunnel cap so as to provide a rigid self-supporting structure capable of providing the major support for an upper body structure. A further object of this invention is to provide an improved underbody structure for unitary vehicle bodies which includes a pair of rigid self-supporting platform members disposed in side by side relationship and interconnected by a tunnel cap structure to provide the major support and the floor for an upper body structure, with each end of the platform members being rigidly secured to a side rail structure of front and rear frame extensions.

These and other objects of this invention will be readily apparent from the following specification and drawings, wherein:

FIGURE 1 is a top plan view of an underbody structure according to this invention;

FIGURE 2 is an enlarged side elevational view of a portion of FIGURE 1;

FIGURE 3 is a sectional view taken generally along the plane indicated by line 3—3 of FIGURE 1;

FIGURE 4 is an enlarged sectional view taken generally along the plane indicated by line 4—4 of FIGURE 1;

FIGURE 5 is an enlarged sectional view taken generally along the plane indicated by line 5—5 of FIGURE 1;

FIGURE 10 is a partially cut away perspective view of a portion of FIGURE 1.

Figure 6:
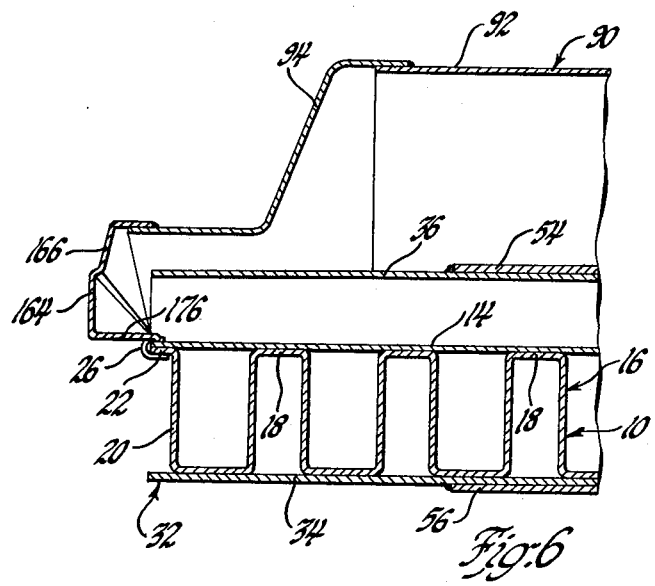
FIGURE 6 is an enlarged sectional view taken generally along the plane indicated by line 6—6 of FIGURE 1.

Referring now particularly to FIGURE 1 of the drawings, the underbody structure generally comprises a pair of rigid self-supporting platform members 10 disposed in side by side relationship intermediate the wheel housing of the body and interconnected by a tunnel cap 12. Each of the platform members is of the same construction, and accordingly only one will be particularly described.

As best shown in FIGURE 10, each of the platform members includes an upper flat panel member 14, and a lower corrugated panel member 16, coextensive therewith. The downwardly opening corrugations 18 of member 16 are each spot welded or otherwise secured to member 14 so as to rigidify member 14 and provide a rigid self-supporting platform member. The corrugations of member 16 are arranged so as to provide an upwardly opening corrugation 20 adjacent the inboard and outboard side edges of panel 14. Each of the corrugations 20 terminates in a short laterally extending flange 22 which is secured to the inboard and outboard side edge portions of panel 14 to provide pinchwelds. The side flanges 23 of the tunnel cap 12 overlap and are secured to the inboard pinchwelds of each of the platform members, as shown in FIGURE 3, to interconnect the platform members and provide a rigid self-supporting underbody and floor for the upper body structure.

As best shown in FIGURES 4, 5, 6, and 7 of the drawings, a sill plate member 24 includes a return bent outboard flange 26 which envelops the outboard pinchwelds of the platform members and is secured thereto. The inboard leg 28 of the sillplate is of stepped construction, with the lower stepped flange 30 being secured to panel 14 and adapted to receive the padding or other carpet underlayer, and the stepped flange 31 being adapted to receive the carpet so that the floor of the body is level between the upper edge of the sillplate and each side of the tunnel cap.

Figure 9:
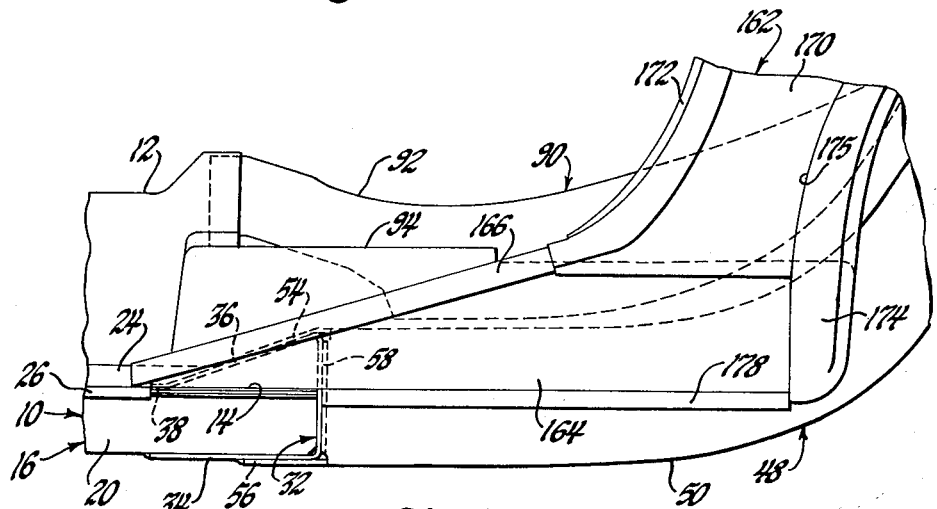
FIGURE 9 is an enlarged view of a portion of FIGURE 2.

Each end of the platform members is closed by a channel end cap. The rear end caps 32 include a lower leg 34, FIGURES 9 and 10, which is secured to the bases of the upwardly opening corrugations, and an upper angular leg 36 which terminates in a lateral flange 38 welded to panel 14. The front channel end caps 40 include a lower leg 42 secured to the bases of the upwardly opening corrugations and an upper angular leg 44 terminating in a lateral flange 45 secured to panel member 14. Caps 32 and 40 extend the full width of the platform members and prevent the entry of foreign material into the upwardly opening corrugations. A portion of the inboard forward corners of platform members 10 is cut away and end caps 40 are shaped at 46 so as to cover the cut away portions of the platform members. A series of inwardly lanced tabs 47 in the bases of the channel end caps engage the edges of panel 14 to locate the end caps with respect to the platform members. The sillplate members 24 extend between and are secured to the legs 36 and 44 of end caps 32 and 40.

A rear generally U-shaped frame extension 48 includes a pair of side rails 50 of C-shaped cross section interconnected by one or more transverse rails 52. The forward portions of rails 50 flare outwardly, and the forward ends thereof are cut away to provide upper and lower flanges 54 and 56 which respectively engage legs 36 and 34 of end caps 32 therebetween, with the flanges being welded or otherwise rigidly secured to the end caps. A lateral flange 58 intermediate flanges 54 and 56 engages and is secured to the bases of the channel end caps 32. A pair of angle braces 60 of C-shaped cross section have their rearward ends fitting within and secured to rails 50. The forward ends of braces 60 are cut away to provide upper and lower flanges similar to flanges 54 and 56 which engage and are secured to the legs 34 and 36 of end caps 32 inboard of flanges 54 and 56.

A forward generally U-shaped frame extension 68 includes a pair of side rails 70 of C-shaped cross-section which are interconnected by a number of transverse rails 72. The rearward portions of rails 70 flare outwardly, and the rearward ends thereof are cut away to provide upper and lower flanges 74 and 76, respectively, which straddle and are respectively rigidly secured to the legs 44 and 42 of end caps 40. A lateral flange 78, intermediate flanges 74 and 76, engages and is secured to the bases of the channel-shaped end caps 40. Angle braces 80 of C-shaped cross section have their forward ends fitting within and secured to rails 70. The rearward ends of the braces 80 are cut away to provide upper and lower flanges similar to flanges 74 and 76 which are secured to the end caps 40 adjacent the sides of the cut away portions 46 thereof. A pair of motor support braces 82 extend rearwardly from an intermediate portion of the rails 70, with braces 82 being generally of C-shaped cross section so as to straddle and be secured to the rearward ends of braces 80.

A toe pan panel 86 includes a central tunnel portion 88 which is overlapped by and secured to the forward edge of the tunnel cap 12. The rear edge of the top pan panel is secured to panel 14 immediately rearward of the flanges 45 of caps 40 and intermediate the tunnel cap and the sillplate members 24. Panel 86 carries the floor of the underbody provided by panels 14 forwardly and upwardly to the cowl of the body. A rear seat riser panel 90 includes a central tunnel portion 92 overlapped by and secured to the rearward edge of the tunnel cap. The forward edge of riser panel 90 is secured to the legs 36 of the rear end caps 32 intermediate the tunnel cap 12 and rear lock pillar braces 94. Braces 94 have their inner edges overlapping and secured to the riser panel 90 and also have their forward edges secured to legs 36 of end caps 32.

Figure 8:
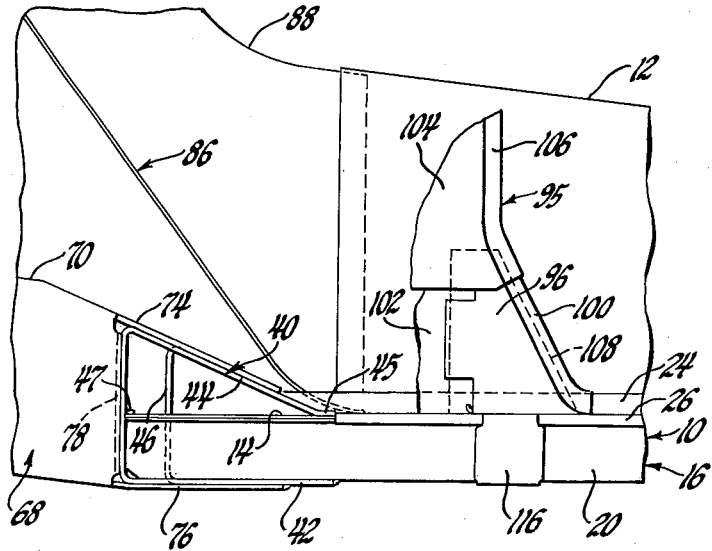
FIGURE 8 is an enlarged view of a portion of FIGURE 2.

Referring now particularly to FIGURES 2, 4 and 8, the front door hinge pillar 95 of the body includes an outer pillar member 96 which includes a lower lateral flange 98 having the inboard flanged edge thereof secured to the upper leg of flange 26 of the sillplate member 24 and a rear arcuately shaped lateral rabbeted flange 100 which sweeps outwardly and upwardly from flange 98. An inner pillar member 102 is secured to flanges 98 and 100. A pillar member 104 includes a rear arcuately shaped lateral flange 106 shaped similar to flange 100 so as to continue the rabbeted face of the pillar upwardly of the body, and a lateral flange 107 secured to member 102. Member 104 and the flange 106 thereof overlie member 96 and the flange 100 thereof. A channel pillar brace 108 includes an upper lateral flange 110 welded to member 102, a pair of side flanges 112 shaped so as to fit over the sillplate member 24 and welded thereto and to member 102, and an inboard lateral flange 114 secured to panel 14. An outboard brace member 116 has the upper end thereof secured to the outboard edge of flange 98 and the lower flanged edge 118 thereof secured to the outboard corrugation 20. The triangularly shaped sides 120 of member 116 each include lateral flanges 121 and 122 secured to flange 98 and the outboard corrugation 20, respectively.

Referring now particularly to FIGURES 1, 2 and 5 of the drawings, the center pillar 124 will be described. An outer generally triangularly-shaped pillar member 126 includes a lower laterally inwardly-extending flange 128, the inboard edge portion of which is secured to the upper leg of the return bent flange 26 as shown in FIGURE 5. Member 126 includes a pair of arcuate rabbeted side flanges 130 and 132 which sweep outwardly and upwardly from the flange 128.

Flange 130 cooperates with the upper leg of flange 26, the outboard leg 134 of member 24, and with flanges 100 and 106 in defining the lower portion of the inboard rabbeted edge of the front door opening. An inner pillar member 136 extends between flanges 130 and 132 and is welded thereto. Member 136 further includes a lateral flange 138 which is welded to the sill-plate member 24 as shown in FIGURE 5. An upper pillar member 140 includes a pair of lateral rabbeted flanges 142 and 144 which continue flanges 130 and 132 upwardly of the body. Member 142 overlies and is secured to member 126 and to a plate member 146 which is also secured to member 136. An outer filler member 148 of generally triangular shape includes an upper lateral flange 149 and a pair of side lateral flanges 150 welded to member 126, and a lower offset lateral flange 152. Flange 152 is welded to a brace member 154 which extends between and is secured to the outboard edge of flange 128 and the outboard corrugation 20. Member 154 further includes a pair of triangularly-shaped side flanges 156, each including lateral flanges 158 and 160 secured to flange 128 and to the outboard corrugation 20, respectively.

Referring now particularly to FIGURES 1, 2, 6, and 9, the rear lock pillar 162 will be described. Pillar 162 includes an outer pillar member 164 which sweeps outwardly and rearwardly from the outboard rear corner of the platform member 10 and includes an upper rabbeted lateral flange 166 which merges into an inboard generally vertically disposed flange 168. Flange 166, before it merges into flange 168, is secured to member 94 and flange 168 is secured to member 94 and to the rear floor pan riser 90. An upper pillar member 170 overlaps and is welded to the member 164 and includes an arcuate lateral rabbeted flange 172 which continues flange 166 upwardly of the body. Flanges 172 and 166, the outboard leg 134 of member 24, the upper leg of flange 26, and flanges 132 and 144 define the lower portion of the inboard rabbeted edge of the rear door opening. The body outer quarter panel 174 includes a laterally inwardly extending flange 175 which is welded or otherwise secured to the rear edge portions of members 164 and 170 to define the outer rear corner portion of the rear door opening. Member 164 includes a lower lateral flange 176, the forward portion of which is secured to panel 14 underneath leg 36 of channel cap 32, and the rear portion of which terminates in a lateral flange 178.

Figure 7:
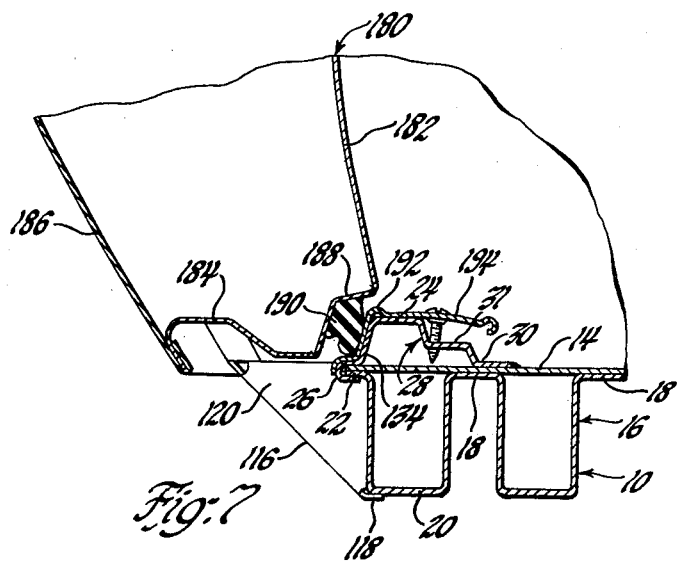
FIGURE 7 is an enlarged sectional view similar to FIGURE 4 showing the relationship of the outboard edge of the platform member to the door structure.

FIGURE 7 is a typical cross section showing the relationship between the door and the door openings. A typical door 180 which may either be the front or rear door, although the front door is shown, includes an inner door panel 182 having a lower wall 184 which is secured to the door outer panel 186 by a return bent flange on the outer panel overlapping a flange on wall 184. Wall 184 includes an offset flange portion 188 which mounts a door weather strip 190 sealing against the outboard leg 192 of a carpet retainer 194. It will be noted that the outboard leg of the carpet retainer generally follows the contour of the upper leg of flange 26 and the outboard leg 134 of the sillplate member 24. It will further be noted that the outboard corrugations 20 of the platform members 10 provide the rocker members for the body and that they are located generally inboard with respect to the outer and inner panels 186 and 182, respectively, of the door.

I claim:

1. In a motor vehicle, an underbody structure comprising, in combination, a pair of rectangularly-shaped rigid platform members disposed in spaced side by side juxtaposed relationship intermediate the wheel housings of said vehicle, each of said platform members being a self-contained self-supporting unit highly resistant to lateral and torsional bending moments and including an upper panel providing a floor portion and a lower corrugated member secured thereto to rigidify said panel, a tunnel cap disclosed between and secured to the juxtaposed side edge portions of each of said platform members to complete the floor for said vehicle and provide a self-supporting combined underbody and floor for said vehicle, said cap being the sole connecting means between the juxtaposed sides of said platform members and being less resistant to lateral and torsional bending moments than said platform members, the application of a bending moment to one of said platform members tending to twist said one member about its own axis being resisted solely by said one member, the application of a force to said underbody structure tending to shift the juxtaposed side edge portions of said platform members out of their normal planar relationship resulting in the application of bending moments to said tunnel cap and being resisted thereby, and front and rear frame extensions disposed at opposite ends of said members, each of said extensions including a pair of side wall structures, one of said structures being secured to an end of one of said members and the other of said structures being secured to the same end of the other of said members.

2. An underbody structure as set forth in claim 1 wherein said lower member includes an upwardly opening corrugation located adjacent the inboard and outboard edges of said panel and a flange extending laterally from each of said corrugations and secured to the inboard and outboard edge portions of said panel to provide inboard and outboard pinchwelds rigidifying said respective edges of said panel, said tunnel cap being secured to the inboard pinchwelds.

3. An underbody structure as set forth in claim 2 wherein a sill plate is located on said panel adjacent said outboard edge thereof and is secured to said outboard pinchweld to rigidify the outboard edge of said platform member.

References Cited in the file of this patent

UNITED STATES PATENTS

| | | |
|---|---|---|
| 1,441,854 | Heintz | Jan. 9, 1923 |
| 2,164,098 | Tjaarda | June 27, 1939 |
| 2,271,310 | Schafer | Jan. 27, 1942 |
| 2,544,525 | Cadwallader | Mar. 6, 1951 |
| 2,767,015 | Bohlen | Oct. 16, 1956 |
| 2,819,925 | Wilfert | Jan. 14, 1958 |
| 2,851,302 | Owen | Sept. 9, 1958 |

FOREIGN PATENTS

| | | |
|---|---|---|
| 48,482 | France | Nov. 29, 1937 |
| | (Add. of 744,879) | |